United States Patent [19]

Wetmore

[11] Patent Number: 4,589,498
[45] Date of Patent: May 20, 1986

[54] PLOW SHARE OVERCAP

[75] Inventor: Halsey J. Wetmore, Guymon, Okla.

[73] Assignee: Adams Hard-Facing Company, Inc., Guymon, Okla.

[21] Appl. No.: 705,199

[22] Filed: Feb. 25, 1985

Related U.S. Application Data

[60] Division of Ser. No. 433,715, Oct. 12, 1982, Pat. No. 4,529,042, which is a continuation-in-part of Ser. No. 269,406, May 29, 1981, Pat. No. 4,363,364.

[51] Int. Cl.⁴ .................. A01B 23/00; A01B 39/22
[52] U.S. Cl. ................................ 172/719; 172/747; 172/745
[58] Field of Search ............... 172/732, 719, 745, 747, 172/772, 730, 722, 724; 37/141 R, 141 T

[56] References Cited

U.S. PATENT DOCUMENTS

| | | | |
|---|---|---|---|
| 604,205 | 5/1898 | Crobarger | 172/732 |
| 2,051,234 | 8/1936 | Wiese | 172/745 |
| 2,335,977 | 12/1943 | Thomas | 172/753 |
| 2,490,893 | 12/1949 | Wiese | 172/745 |
| 2,906,015 | 9/1959 | Piepho | 172/745 |
| 4,408,667 | 10/1983 | Jarvis | 172/719 |

FOREIGN PATENT DOCUMENTS

| | | | |
|---|---|---|---|
| 449597 | 7/1948 | Canada | 172/719 |
| 375048 | 2/1907 | France | 172/753 |
| 435505 | 9/1935 | United Kingdom | 172/719 |

Primary Examiner—Ricahrd J. Johnson
Attorney, Agent, or Firm—William R. Laney

[57] ABSTRACT

A tillage tool appendage which includes a base plate or shank portion, adapted to be connected to the frame of the tillage tool, and a plow point bar-overcap welded to the base plate or shank portion. The plow point bar-overcap includes a leading edge lip which overhangs the base plate or shank portion so as to extend past the lower or bottom surface of the base plate or shank portion, and an overcap which lies atop the base plate or shank portion. Weld metal is deposited between the leading edge lip and the base plate or shank portion in a shielded location and is utilized for joining the plow point bar-overcap to the base plate or shank portion.

1 Claim, 9 Drawing Figures

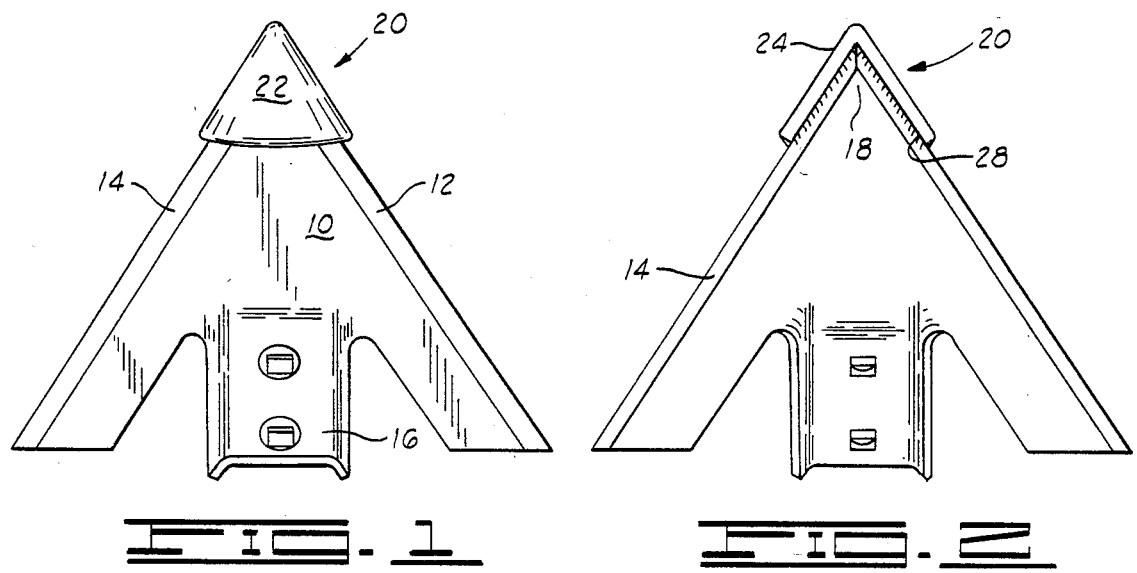
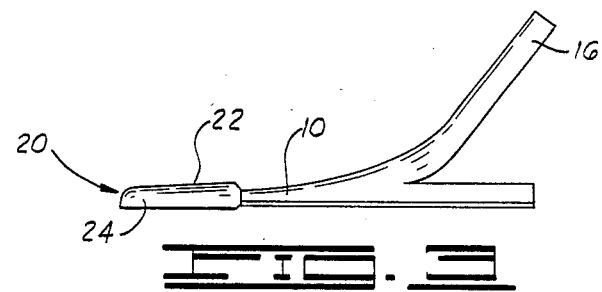
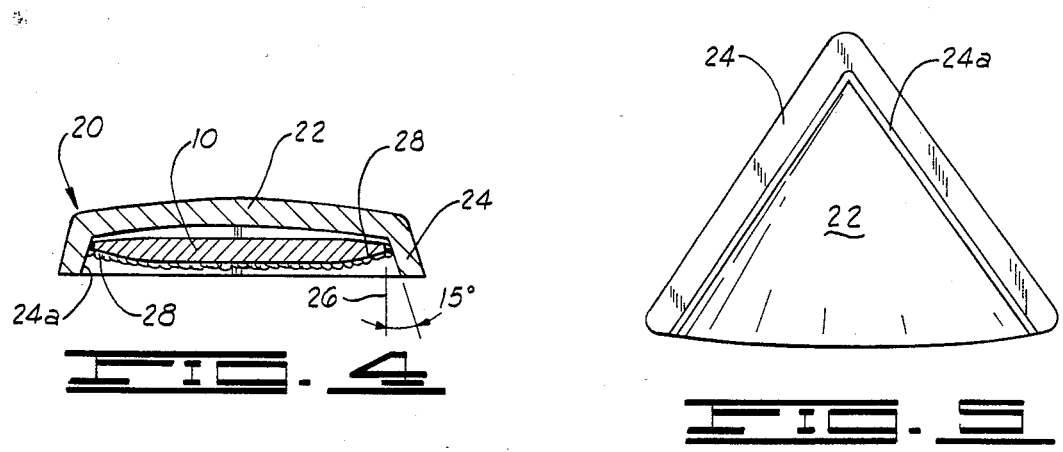

PLOW SHARE OVERCAP

RELATED APPLICATION

This is a division of application Ser. No. 433,715, filed Oct. 12, 1982, now U.S. Pat. No. 4,529,042 which is a continuation-in-part of application Ser. No. 269,406, filed May 29, 1981, now U.S. Pat. No. 4,363,364.

Background of the Invention

1. Field of the Invention

This invention relates to tillage tools, and more particularly to extended life tillage tools having abrasion resistant leading cutting edges.

2. Brief Description of the Prior Art

Various types of hard facing elements have been provided as appendages on tillage tools for the purpose of reducing destructive abrasive wear at the leading edge of such tools, and thereby increasing the effective service life of the tool. In some cases, caps or sleeves have been provided for this purpose, and have been constructed of a metal alloy having high hardness and excellent wear characteristics, such as chromium carbide and tungsten carbide.

One such capped tillage tool is that which is illustrated and described in my co-pending U.S. Patent Application Ser. No. 269,406, referred to above. The chisel plow point there described is a case chromium carbide element which is welded to the point of the chisel plow shank and is configured to deflect soil away from the shank and thus afford protection from abrasive wear.

Other types of hard facing elements are those which are illustrated and described in U.S. Pat. Nos. 484,758; 604,205; 1,904,119; 2,598,121; 139,750; 2,876,853; 866,450; 1,145,212; 549,742; 3,188,989; 3,326,152; 2,598,121; 3,439,636 and 680,400.

BRIEF DESCRIPTION OF THE PRESENT INVENTION

The present invention is a tillage tool appendage which is effective to greatly increase the service life of tools employed in soil tillage by affording greatly enhanced protection to softer, more easily abraded parts of the tool. Broadly described, the tillage tool appendage of the present invention includes a base plate or shank portion, and an integrally formed plow point bar-overcap which is secured to the base plate or shank portion by welding. The plow point bar-overcap includes a leading edge lip which overhangs the base plate or shank portion to deflect abrasive soil particles, rocks and the like away from the shank portion. A weld securement is placed behind the leading edge lip and against the base plate or shank portion in the protected angle between these two elements. The plow point bar-overcap is constructed of a high hardness metal alloy, and in a preferred embodiment, is centrifugally cast as a unit.

An important advantage of the present invention is the greatly increased effective operating life which it has afforded tillage tools to which the appendage has been attached.

Another object of the invention is to provide a tillage tool appendage which is relatively inexpensive to manufacture, thus adding relatively little to the overall cost of the tillage tool on which it is used, and which permits the tillage tool to be used for many more hours and to till many more acres of land than could be expected with a conventional tillage tool not having the benefit of the present invention.

An additional object of the invention is to provide a tillage tool appendage which, by its geometry and relationship to a supporting shank of various types of tillage tools to which it can be mounted, functions to develop a sacrificial layer of caked earth over the softer metal part of the shank to which it is attached, thus protecting the metal shank from abrasive wear by contact with soil and rock particles encountered in the course of tilling.

Further and additional objects of the present invention will be understood from the ensuing description of the invention, when such is considered in conjunction with the accompanying drawings which are illustrative of a preferred embodiment of the invention.

GENERAL DESCRIPTION OF THE DRAWINGS

FIG. 1 is a plan view of a cultivator sweep having tillage tool appendage of the present invention incorporated therein.

FIG. 2 is a bottom plan view of the cultivator sweep illustrated in FIG. 1.

FIG. 3 is a side elevation view of the cultivator sweep illustrated in FIG. 1.

FIG. 4 is sectional view taken along line 4—4 of FIG. 1.

FIG. 5 is a bottom plan view of the plow point bar-overcap forming a part of the present invention, and illustrating such a plow point bar-overcap shape for use on a cultivator sweep of the type illustrated in FIG. 1–3.

DETAILED DESCRIPTION OF PREFERRED EMBODIMENTS OF THE INVENTION

Figure 6:
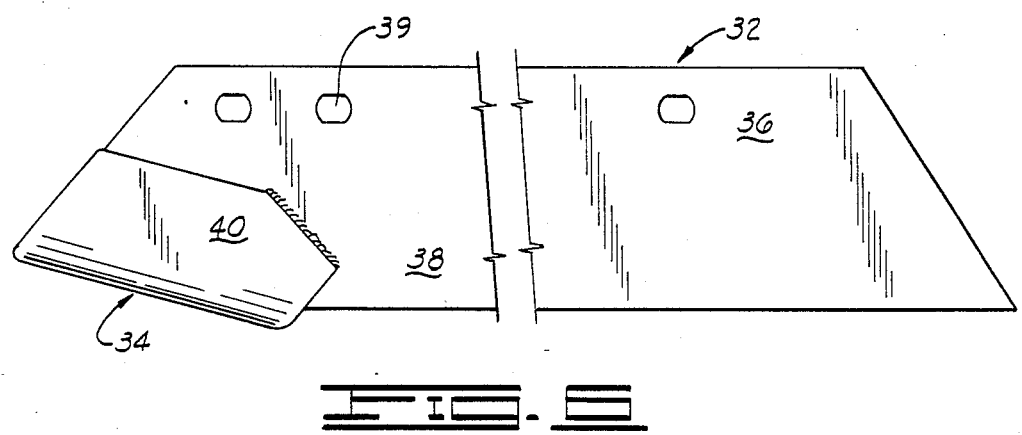
FIG. 6 is a top plan view of a plow share incorporating the tillage tool appendage of the invention.
Figure 7:
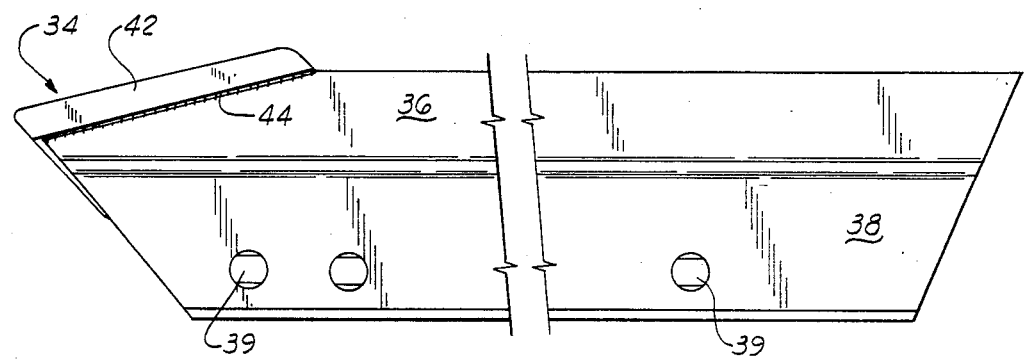
FIG. 7 is a bottom plan view of the plow share illustrated in FIG. 6.

In FIGS. 1–4, a cultivator sweep constructed in accordance with the present invention is illustrated. The sweep includes a pointed base plate 10 having converging sharpened side edges 12 and 14 and a central shank 16 by which the sweep is bolted the framework of a supporting implement. The base plate 10 is pointed at its leading end, the point 18 being best illustrated is FIG. 2 of the drawings. Fitted over the pointed end 18 of the base plate 10 is a plow point bar-overcap, designated generally by reference numeral 20. The plow point bar-overcap includes an overcap portion 22 and a leading edge lip 24. The leading edge lip 24 overhangs the base plate 10 and projects downwardly therefrom as best illustrated in FIG. 2–4. The plow point bar-overcap 20 is preferably an integrally cast element, and is made of a high hardness metal alloy. Preferably, the plow point bar-overcap is centrifugally cast as a unit, utilizing a chromium carbide alloy.

It will be noted that the leading edge lip 24 defines an obtuse angle with the principal plane of the overcap 22 as shown in FIG. 4. The inner surface of the leading edge lip 24 which is adjacent the base plate 10 defines an angle of from about 10 to 20 degrees with respect to the side edge of the base plate or, stated differently, with respect to a perpendicular to the horizontal when the sweep is in a truly horizontal position, as such perpendicular is represented by the dashed line 26 shown in FIG. 4. By reason of the described angulation, a gap is formed between the side edge of the base plate 10 in the inner surface of the overhanging leading edge lip 24 of the plow point bar-overcap 20. This gap is filled with weld metal 28 in the course of securing the plow point bar-overcap to the base plate. As shown in FIGS. 2 and 4, the weld metal 28 can also be built up in the space between the surrounding leading edge lip 24 and the lower surface of the base plate 10 so that the weld metal is shielded from contact with the earth as the sweep is driven through the earth during tilling.

As previously pointed out, by reason of the overhang of the leading edge lip 24, an enclosed space or pocket is formed beneath the lower side of the base plate 10 and within the confines of the leading edge lip 24. During the use of the tillage tool, this space becomes filled with compacted soil which acts as a hard sole or curst beneath the sweep, and protects the weld metal 28 by which the plow point bar-overcap is secured to the plate 10, and also protects the base plate itself from abrasive wear from any soil particles which may fail to be deflected by the overhang as the sweep moves through the soil.

In FIGS. 6-9 of the drawings, another embodiment of the invention is illustrated. In these views of the drawings, the plow point bar-overcap appendage of the invention is shown as it is utilized on a plow share. The plow share is indicated generally by reference numeral 32 and the plow point bar-overcap is designated by reference numeral 34. The plow share includes a base plate 36 to which the plow point bar-overcap 34 is secured, and a shank portion 38 which is provided with apertures 39 to facilitate bolting the shank portion to the frame of a tillage implement upon which the plow share is carried.

Figure 8:
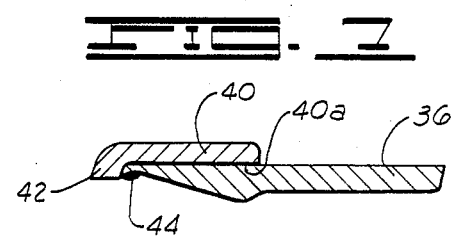
FIG. 8 is a sectional view taken along line 8—8 of FIG. 7.
Figure 9:
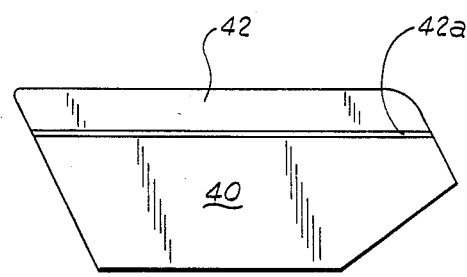
FIG. 9 is a bottom plan view of the plow point bar-overcap utilized on the plow share illustrated in FIG. 6.

The plow point bar-overcap includes an overcap portion 40 and a leading edge lip 42. As previously described, the inner side surface 42a of the leading edge lip 42 projects at an angle to the major or principal plane or the overcap 40, with this angle being between 100° and 110°. An angle of 105° is preferred. The gap thus defined between the leading edge lip 42 and the side edge of the base plate 36 of the plow share 32 is filled with weld metal 44 as illustrated in FIG. 8. It will again be noted that a space or surrounded enclosure is formed between the overhanging portion of the leading edge lip 42 and that portion of the base plate 36 which is adjacent this lip, so that a layer of compacted or hardened earth can be developed in this zone for protection of the weld metal used to secure the plow point bar-overcap to the base plate 36.

Although certain preferred embodiments of the invention have been herein described in order to afford a clear understanding of the basic principles upon which the invention is based, it will be understood that various changes and innovations in these illustrated embodiments can be effected without departure from these basic principles. Thus, the type of plow point bar-overcap described can be used, with its overhanging leading edge lip, on other types of tillage implements for the purpose of protecting the leading edges of these implements, and substantially extending the operating life of the implement. Forms of the invention which are deviant from those shown in the drawings presented herewith, but which retain the principles herein described in achieving the objectives of this invention, are thus deemed to also be within the spirit and scope of the invention, except as the same may be necessarily limited by the appended claims or reasonable equivalents thereof.

What is claimed is:

1. A tillage tool comprising:
    a plow share adapted for connection to the frame of a tillage implement and having a top surface, a bottom surface and a leading edge;
    a plow point bar-overcap mounted on said plow share and including:
        an overcap on said top surface, said overcap defining a major principle plane; and
        a leading edge lip projecting downwardly and slightly outwardly from said overcap, and overhanging the plow share adjacent the leading edge thereof, said leading edge lip projecting to a location below the bottom surface of said plow share, and said leading edge lip including an inner surface adjacent said plow share leading edge and inclining away from said plow share leading edge to define a wedge shaped weld metal-receiving gap therewith; and
    weld metal positioned in said gap between said lip inner surface and plow share leading edge to join said plow point bar-overcap to said plow share at a location where said weld metal is protected by said leading edge lip.

* * * * *